US008332767B1

(12) United States Patent
Beil et al.

(10) Patent No.: US 8,332,767 B1
(45) Date of Patent: Dec. 11, 2012

(54) SYSTEM AND METHOD FOR DYNAMIC COORDINATION OF TIMELINES HAVING COMMON INSPECTABLE ELEMENTS

(76) Inventors: Jeffrey Beil, Brooklyn, NY (US); John Rothenberg, Boston, MA (US); Eric Gunther, Boston, MA (US); Justin Manor, Boston, MA (US)

(*) Notice: Subject to any disclaimer, the term of this patent is extended or adjusted under 35 U.S.C. 154(b) by 0 days.

(21) Appl. No.: 13/290,591

(22) Filed: Nov. 7, 2011

(51) Int. Cl.
G06F 3/048 (2006.01)
G06F 3/00 (2006.01)

(52) U.S. Cl. ........ 715/764; 715/835; 715/255; 715/230; 715/273

(58) Field of Classification Search .................. 715/764, 715/835, 255, 723, 230, 273
See application file for complete search history.

(56) References Cited

U.S. PATENT DOCUMENTS

| 7,725,492 | B2 | 5/2010 | Sittig et al. | |
|---|---|---|---|---|
| 8,065,604 | B2* | 11/2011 | Blankinship | 715/229 |
| 2002/0075322 | A1* | 6/2002 | Rosenzweig et al. | 345/835 |
| 2005/0210409 | A1* | 9/2005 | Jou | 715/811 |
| 2005/0283798 | A1* | 12/2005 | Hunleth et al. | 725/37 |
| 2006/0036960 | A1* | 2/2006 | Loui | 715/764 |
| 2006/0265249 | A1* | 11/2006 | Follis et al. | 705/3 |
| 2008/0126979 | A1* | 5/2008 | Abe et al. | 715/781 |
| 2008/0208791 | A1* | 8/2008 | Das et al. | 707/1 |
| 2008/0244453 | A1* | 10/2008 | Cafer | 715/835 |
| 2008/0294663 | A1* | 11/2008 | Heinley et al. | 707/100 |
| 2010/0107117 | A1* | 4/2010 | Pearce et al. | 715/790 |
| 2011/0216067 | A1* | 9/2011 | Schorr et al. | 345/440 |

\* cited by examiner

*Primary Examiner* — Nicholas Augustine
*Assistant Examiner* — Toan Vu
(74) *Attorney, Agent, or Firm* — Leason Ellis LLP

(57) ABSTRACT

Systems and methods are provided for dynamic coordination of inspectable elements across timelines. In one arrangement, timelines are processed to identify common chronological events. Such events can be associated and rendered across the timelines. In another arrangement, selectable elements are rendered in relation to a timeline. The selection of such selectable elements highlights one or more of the associated inspectable elements. In another arrangement, a selection is received at the first timeline, and, in response, events are highlighted at the second timeline and inspectable elements are rendered at the second timeline pertaining to the selection. In another arrangement, metadata associated with a received selection is processed against a database to provide a second timeline, and the second timeline is populated with one or more additional elements that are chronologically proximal to the particular element in the first timeline to thereby provide a dynamic association between the first and second timelines.

20 Claims, 11 Drawing Sheets

SYSTEM AND METHOD FOR DYNAMIC COORDINATION OF TIMELINES HAVING COMMON INSPECTABLE ELEMENTS

TECHNICAL FIELD OF THE INVENTION

This patent application relates generally to the field of dynamic coordination of inspectable elements that are displayable on a screen, and, in particular, to dynamic coordination of inspectable elements across one or more timelines.

BACKGROUND OF THE INVENTION

Various social networking sites such as Facebook™ enable a user to interact with other users and/or share media and updates with one another. While such tools are useful to build and maintain socially-focused connections, these sites generally lack a sense of chronology and/or time. That is, no such mechanism exists whereby a user can view another user's elements (e.g., media such as images and/or video) and/or events (e.g., media that correspond to a particular event), and further search for and/or identify such events from a chronological perspective.

Moreover, considering the prevalence of digital media (such as digital photos and video) in everyday life, it is inevitable that substantial amounts of such media is generated on a regular basis such that would be—in theory—of interest to a particular user. For example, if a user attends a party or event, there is a significant likelihood that that user appears in photos or video taken by various of the attendees at the party/event. However, unless such a user actually knows the individual(s) who took the picture/video (e.g., is "friends" with that user—using a Facebook™ term), it is unlikely that the user will actually see the picture/video that he/she is featured in.

It is with respect to these and other considerations that the disclosure made herein is presented.

SUMMARY OF THE INVENTION

Technologies are presented herein in support of a system and method for dynamic depiction and coordination of one or more inspectable elements across one or more timelines. According to a first aspect, a computer implemented method for dynamic association of elements in a first timeline with a second timeline at a central machine is provided, the central machine having a processor, a memory, and a coordination application stored in the memory and executable by the processor, and each of the first timeline and the second timeline having one or more inspectable elements that correspond to one or more chronological events. The method includes receiving a selection of a particular element in the first timeline into the memory of the central machine through interaction with a user interface on a computing device, processing at least a one metadata associated with the received selection against a database; providing to the computing device for display thereat at least a second timeline based on the result of the processing, the second timeline being associated with an entity or person identified in the at least one metadata of the particular element of the first timeline, and populating the second timeline with one or more additional elements from the database, at least a portion of which has a chronological proximity to the particular element in the first timeline to thereby provide a dynamic association between the first and second timelines.

According to another aspect, a computer implemented method for dynamic chronological coordination of a first timeline and a second timeline at a central machine is provided, the central machine having a processor, a memory, and a coordination application stored in the memory and executable by the processor, and each of the first timeline and the second timeline having one or more inspectable elements that correspond to one or more chronological events. The method includes receiving a selection of at least one of the one or more inspectable elements, and the one or more chronological events of the second timeline, processing the first timeline against at least a second timeline based on the selection to identify one or more common chronological events shared across the first timeline and the second timeline, generating an association of the common chronological events within the context of the first timeline and the second timeline, and rendering one or more graphical features that reflect the association.

According to another aspect, a computer implemented method for dynamic depiction of inspectable elements across a timeline at a central machine is provided, the central machine having a processor, a memory, and a coordination application stored in the memory and executable by the processor, and the timeline having one or more inspectable elements. The method includes depicting at least a section of the timeline, rendering one or more selectable elements in relation to the section, the selectable elements representing at least one of (a) one or more users and (b) one or more events that are related to the section, receiving a selection of at least one of the selectable elements, and, in response to the selection, highlighting one or more of the inspectable elements within the section that relate to the selection.

According to yet another aspect, a computer implemented method for dynamic depiction of inspectable elements shared by a first timeline and at least a second timeline at a central machine is provided, the central machine having a processor, a memory, and a coordination application stored in the memory and executable by the processor, and each of the inspectable elements corresponding to one or more chronological events. The method includes receiving a selection of at least one of (a) the one or more inspectable elements, and (b) the one or more chronological events at the first timeline, in response to the selection, highlighting at least one of (a) the one or more inspectable elements, and (b) the one or more chronological events, at the at least second timeline, and rendering one or more inspectable elements at the at least second timeline that pertain to at least one of (a) the one or more selected inspectable elements, and (b) the one or more selected chronological events.

These and other aspects, features, and advantages can be appreciated from the accompanying description of certain embodiments of the invention and the accompanying drawing figures.

DETAILED DESCRIPTION OF CERTAIN EMBODIMENTS OF THE INVENTION

Figure 1:
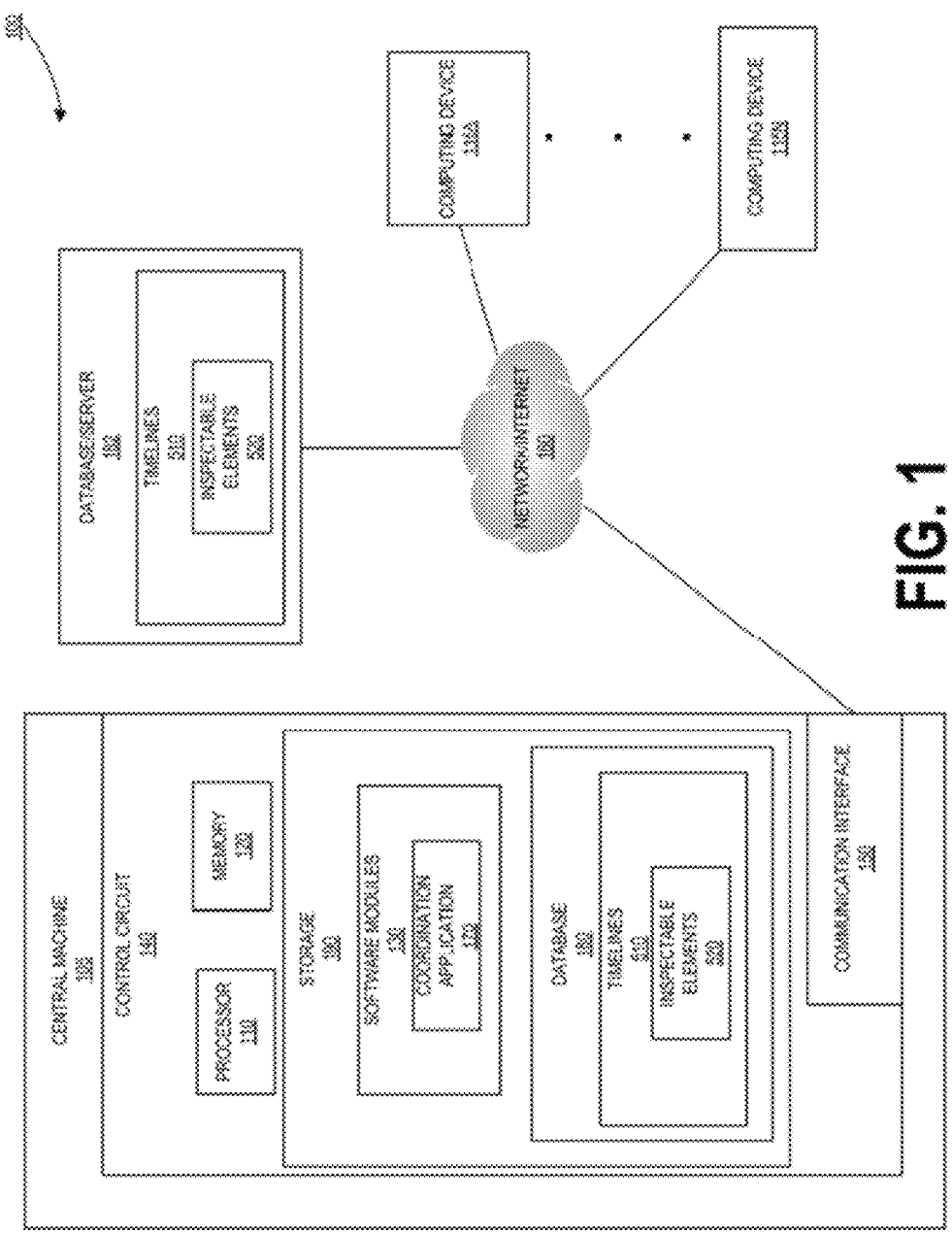
FIG. 1 is a high-level diagram illustrating an exemplary configuration of a of a dynamic depiction and coordination system.

By way of overview and introduction, various systems and methods are described herein that enable the dynamic depiction, association, and coordination of one or more inspectable elements across one or more timelines. It can be appreciated that many types of media elements, such as photographs and videos, and particularly those that focus on people and/or events (such as parties, weddings, gatherings, etc.) are frequently potentially of interest to a large number of people and, at minimum are of interest to those people who participated in and/or were associated with such people and/or events to which such media elements correspond. However, despite contemporary advances in technology, such media elements are generally only accessible to and/or viewed by a small fraction of the potential total audience for such media, such as a group of users that are linked to one another through a social networking site. In fact, in many instances individuals who may have interest in a particular photo or video (such as one taken at a party they attended) are not even aware of its existence.

In an effort to expand the potential audience of such media to as many users as may be interested in a particular media element, a timeline scheme can be implemented whereby such media elements are depicted on a display of a computer or other processor-based device in chronological order across such a timeline (in prior art approaches, such elements are generally organized in arbitrary, user-defined ways, such as grouping media elements by topic, e.g., 'friends,' and 'vacations'). Such timelines—each of which preferably corresponds to a particular individual or entity—are advantageous in that they organize media elements in an absolute, universal manner—that is, chronologically—allowing for seamless and intuitive comparisons, associations, and transfers of various media between multiple timelines. Furthermore, the organization and depiction of such media elements across a chronological timeline enables further functionalities and operations that cannot be effectively employed using other organizational approaches. As will be described in greater detail herein, using such timelines and displayable, inspectable elements, users can further view and discover various media elements that are of interest to them in ways that are more efficient and effective than those previously available.

In particular, the systems and methods disclosed herein incorporate various software modules that, upon execution in a processor, encompass a discovery tool that enables a user to discover connections with other users independent of a pre-existing relationship between them. In one arrangement disclosed herein, this is achieved by revealing to a first user certain coincidental points in the first user's timeline in relation to a timeline of a second user. Various intersecting and/or closely proximate elements and/or events can also be revealed, even if no relationship presently exists between the two (or more) users, as will be described in greater detail below. Accordingly, through interaction with the various timelines referenced herein, the discovery tool enables a user to discover media elements, events, and connections that might not have been previously discoverable through existing applications.

The following detailed description is directed to systems and methods for dynamic depiction, association, and coordination of one or more inspectable elements across one or more timelines. The referenced systems and methods are now described more fully with reference to the accompanying drawings, in which one or more illustrated embodiments and/or arrangements of the systems and methods are shown. The systems and methods are not limited in any way to the illustrated embodiments and/or arrangements as the illustrated embodiments and/or arrangements described below are merely exemplary of the systems and methods, which can be embodied in various forms, as appreciated by one skilled in the art. Therefore, it is to be understood that any structural and functional details disclosed herein are not to be interpreted as limiting the systems and methods, but rather are provided as a representative embodiment and/or arrangement for teaching one skilled in the art one or more ways to implement the systems and methods. Accordingly, aspects of the present systems and methods can take the form of an entirely hardware embodiment, an entirely software embodiment (including firmware, resident software, micro-code, etc.), or an embodiment combining software and hardware. One of skill in the art can appreciate that a software process can be transformed into an equivalent hardware structure, and a hardware structure can itself be transformed into an equivalent software process. Thus, the selection of a hardware implementation versus a software implementation is one of design choice and left to the implementer. Furthermore, the terms and phrases used herein are not intended to be limiting, but rather are to provide an understandable description of the systems and methods.

An exemplary computer system is shown as a block diagram in FIG. 1 which is a high-level diagram illustrating an exemplary configuration of a dynamic depiction, association, and coordination system 100. In one arrangement, central machine 105 can be a personal computer or server. In other arrangements, central machine 105 can be a tablet computer, a laptop computer, or a mobile device/smartphone, though it should be understood that central machine 105 of dynamic depiction, association, and coordination system 100 can be practically any computing device capable of embodying the systems and/or methods described herein.

Central machine 105 of dynamic depiction, association, and coordination system 100 includes a control circuit 140 which is operatively connected to various hardware and software components that serve to enable operation of the dynamic depiction, association, and coordination system 100. The control circuit 140 is operatively connected to a processor 110 and a memory 120. Processor 110 serves to execute instructions for software that can be loaded into memory 120. Processor 110 can be a number of processors, a multi-processor core, or some other type of processor, depending on the particular implementation. Further, processor 110 can be implemented using a number of heterogeneous processor systems in which a main processor is present with secondary processors on a single chip. As another illustrative example, processor 110 can be a symmetric multi-processor system containing multiple processors of the same type.

Preferably, memory 120 and/or storage 190 are accessible by processor 110, thereby enabling processor 110 to receive and execute instructions stored on memory 120 and/or on storage 190. Memory 120 can be, for example, a random access memory (RAM) or any other suitable volatile or non-volatile computer readable storage medium. In addition, memory 120 can be fixed or removable. Storage 190 can take various forms, depending on the particular implementation. For example, storage 190 can contain one or more components or devices such as a hard drive, a flash memory, a rewritable optical disk, a rewritable magnetic tape, or some combination of the above. Storage 190 also can be fixed or removable.

One or more software modules 130 are encoded in storage 190 and/or in memory 120. The software modules 130 can comprise one or more software programs or applications having computer program code or a set of instructions executed in processor 110. Such computer program code or instructions for carrying out operations for aspects of the systems and methods disclosed herein can be written in any combination of one or more programming languages, including an object oriented programming language such as Java, Smalltalk, C++, Python, and JavaScript or the like and conventional procedural programming languages, such as the "C" programming language or similar programming languages. The program code can execute entirely on central machine 105, partly on central machine 105, as a stand-alone software package, partly on central machine 105 and partly on a remote computer/device, or entirely on the remote computer/device or server. In the latter scenario, the remote computer can be connected to central machine 105 through any type of network, including a local area network (LAN) or a wide area network (WAN), or the connection can be made to an external computer (for example, through the Internet using an Internet Service Provider).

One or more software modules 130, including program code/instructions, are located in a functional form on one or more computer readable storage devices (such as memory 120 and/or storage 190) that can be selectively removable. The software modules 130 can be loaded onto or transferred to central machine 105 for execution by processor 110. It can also be said that the program code of software modules 130 and one or more computer readable storage devices (such as memory 120 and/or storage 190) form a computer program product that can be manufactured and/or distributed in accordance with the present invention, as is known to those of ordinary skill in the art.

It should be understood that in some illustrative embodiments, one or more of software modules 130 can be downloaded over a network to storage 190 from another device or system via communication interface 150 for use within dynamic depiction, association, and coordination system 100. For instance, program code stored in a computer readable storage device in a server can be downloaded over a network from the server to dynamic depiction, association, and coordination system 100.

Preferably, included among the software modules 130 is a coordination application 170 that is executed by processor 110. During execution of the software modules 130, and specifically the coordination application 170, the processor 110 configures the control circuit 140 to dynamically coordinate and depict various elements with central machine 105, as will be described in greater detail below. It should be understood that while software modules 130 and/or coordination application 170 can be embodied in any number of computer executable formats, preferably software modules 130 and/or coordination application 170 comprise one or more applications that are configured to be executed at central machine 105 in conjunction with one or more applications or 'apps' executing at remote devices, such as computing device(s) 115A-N (collectively computing devices 115) and/or one or more viewers such as internet browsers and/or proprietary applications. Furthermore, in certain arrangements, software modules 130 and/or coordination application 170 can be configured to execute at the request or selection of a user of one of computing devices 115 (or any other such user having the ability to execute a program in relation to central machine 105, such as a network administrator), while in other arrangements central machine 105 can be configured to automatically execute software modules 130 and/or coordination application 170, without requiring an affirmative request to execute. It should also be noted that while FIG. 1 depicts memory 120 oriented on control circuit 140, in an alternate arrangement, memory 120 can be operatively connected to the control circuit 140. In addition, it should be noted that other information and/or data relevant to the operation of the present systems and methods (such as databases 180 and/or 182) can also be stored on storage 190, as will be discussed in greater detail below.

A communication interface 150 is also operatively connected to control circuit 140. Communication interface 150 can be any interface that enables communication between the central machine 105 and external devices, machines and/or elements. Preferably, communication interface 150 includes, but is not limited to, a modem, a Network Interface Card (NIC), an integrated network interface, a radio frequency transmitter/receiver (e.g., Bluetooth, cellular, NFC), a satellite communication transmitter/receiver, an infrared port, a USB connection, and/or any other such interfaces for connecting central machine 105 to other computing devices and/or communication networks such as the Internet. Such connections can include a wired connection or a wireless connection (e.g. using the 802.11 standard) though it should be understood that communication interface 150 can be practically any interface that enables communication to/from the control circuit 140.

At various points during the operation of dynamic depiction, association, and coordination system 100, central machine 105 can communicate with one or more computing devices 115A-N (collectively computing devices 115). The computing devices 115 transmit and/or receive data to/from the central machine 105, thereby preferably initiating maintaining, and/or enhancing the operation of the dynamic depiction, association, and coordination system 100, as will be described in greater detail below. It should be understood that computing devices 115 can be in direct communication with central machine 105, indirect communication with central machine 105, and/or can be communicatively coordinated with central machine 105, as will be described in greater detail below. While computing device 115 can be practically any device capable of communication with central machine 105, in the preferred embodiment computing device 115 is a personal computer, server, handheld/portable computer, smartphone, personal digital assistant (PDA), tablet computer, and/or any other such computing device that is capable of transmitting and/or receiving data to/from central machine 105. It should also be appreciated that in many arrangements, computing device 115 will be substantially identical, from a structural and functional perspective, to central machine 105.

It should be noted that while the FIG. 1 depicts the dynamic depiction, association, and coordination system 100 with respect to computing devices 115A, 115B, 115C, and 115N, it should be understood that any number of computing devices can interact with the dynamic depiction, association, and coordination system 100 in the manner described herein. It should be further understood that a substantial number of the operations described herein are initiated by and/or performed in relation to such computing devices 115. For example, as referenced above, such computing devices 115 can execute applications and/or viewers which request and/or receive data from central machine 105, substantially in the manner described in detail herein.

In certain arrangements, one or more external databases and/or servers 182 are also in communication with central machine 105. As will be described in greater detail below, database/server 182 is preferably a computing and/or storage device, and/or a plurality of computing and/or storage devices, that contain(s) information, such as timelines 510 and/or inspectable elements 520 that can be relevant to the dynamic coordinating, associating, and/or depiction by central machine 105. Such external databases/servers 182 are in addition to the internal or local database 180 of central machine 105. It should be understood that databases 180 and 182 can, in many cases, contain similar, complimentary, and/or identical information. The primary distinction between database 180 and database 182 is that database 180 is local to central machine 105 (thus not requiring additional communication to access) while database 182 is external and thus requires communication between central machine 105 and database/server 182 in order to access the data stored therein. By way of illustration, database/server 182 can be an external website such as Facebook, Flickr, Twitter, or Picasa, which contains one or more inspectable elements 520, tags, and/or comments that can be accessed, such as through an application programming interface (API), as is known to those of ordinary skill in the art, and thus incorporated into the various methods and systems described herein, as will be described in greater detail below. It should be noted that, as described in detail below, dynamic depiction, association, and coordination system 100 can be configured such that various items (such as inspectable elements 520) can be stored at one location (such as at database 182), while various other related items can be stored at a second location (such as at database 180), as will be described in greater detail below.

At this juncture it should be noted that in certain arrangements, such as the one depicted in FIG. 1, computing devices 115 and/or database/server 182 can be in periodic or ongoing communication with central machine 105 thorough a computer network such as the Internet 160. Though not shown, it should be understood that in certain other arrangements, computing devices 115 and/or database/server 182 can be in periodic or ongoing direct communication with central machine 105, such as through communications interface 150.

In the description that follows, certain embodiments and/or arrangements are described with reference to acts and symbolic representations of operations that are performed by one or more devices, such as the dynamic depiction, association, and coordination system 100 of FIG. 1. As such, it will be understood that such acts and operations, which are at times referred to as being computer-executed, include the manipulation by the processor of the computer of electrical signals representing data in a structured form. This manipulation transforms the data and/or maintains them at locations in the memory system of the computer, which reconfigures and/or otherwise alters the operation of the computer in a manner understood by those skilled in the art. The data structures in which data are maintained are physical locations of the memory that have particular properties defined by the format of the data. However, while an embodiment is being described in the foregoing context, it is not meant to provide architectural limitations to the manner in which different embodiments can be implemented. The different illustrative embodiments can be implemented in a system including components in addition to or in place of those illustrated for the dynamic depiction, association, and coordination system 100. Other components shown in FIG. 1 can be varied from the illustrative examples shown. The different embodiments can be implemented using any hardware device or system capable of running program code. In another illustrative example, dynamic depiction, association, and coordination system 100 can take the form of a hardware unit that has circuits that are manufactured or configured for a particular use. This type of hardware can perform operations without needing program code to be loaded into a memory from a computer readable storage device to be configured to perform the operations.

For example, central machine 105 can take the form of a circuit system, an application specific integrated circuit (ASIC), a programmable logic device, or some other suitable type of hardware configured to perform a number of operations. With a programmable logic device, the device is configured to perform the number of operations. The device can be reconfigured at a later time or can be permanently configured to perform the number of operations. Examples of programmable logic devices include, for example, a programmable logic array, programmable array logic, a field programmable logic array, a field programmable gate array, and other suitable hardware devices. With this type of implementation, software modules 130 can be omitted because the processes for the different embodiments are implemented in a hardware unit.

In still another illustrative example, central machine 105 can be implemented using a combination of processors found in computers and hardware units. Processor 110 can have a number of hardware units and a number of processors that are configured to execute software modules 130. In this example, some of the processors can be implemented in the number of hardware units, while other processors can be implemented in the number of processors.

In another example, a bus system can be implemented and can be comprised of one or more buses, such as a system bus or an input/output bus. Of course, the bus system can be implemented using any suitable type of architecture that provides for a transfer of data between different components or devices attached to the bus system. Additionally, communications interface 150 can include one or more devices used to transmit and receive data, such as a modem or a network adapter.

Embodiments and/or arrangements can be described in a general context of computer-executable instructions, such as program modules, being executed by a computer. Generally, program modules include routines, programs, objects, components, data structures, etc., that perform particular tasks or implement particular abstract data types.

It should be further understood that while the various computing devices and machines referenced herein, including but not limited to central machine 105, computing devices 115A-N, and database/server 182 are referred to herein as individual/single devices and/or machines, in certain arrangements the referenced devices and machines, and their associated and/or accompanying operations, features, and/or functionalities can be arranged or otherwise employed across any number of devices and/or machines, such as over a network connection, as is known to those of skill in the art.

Figure 1B:
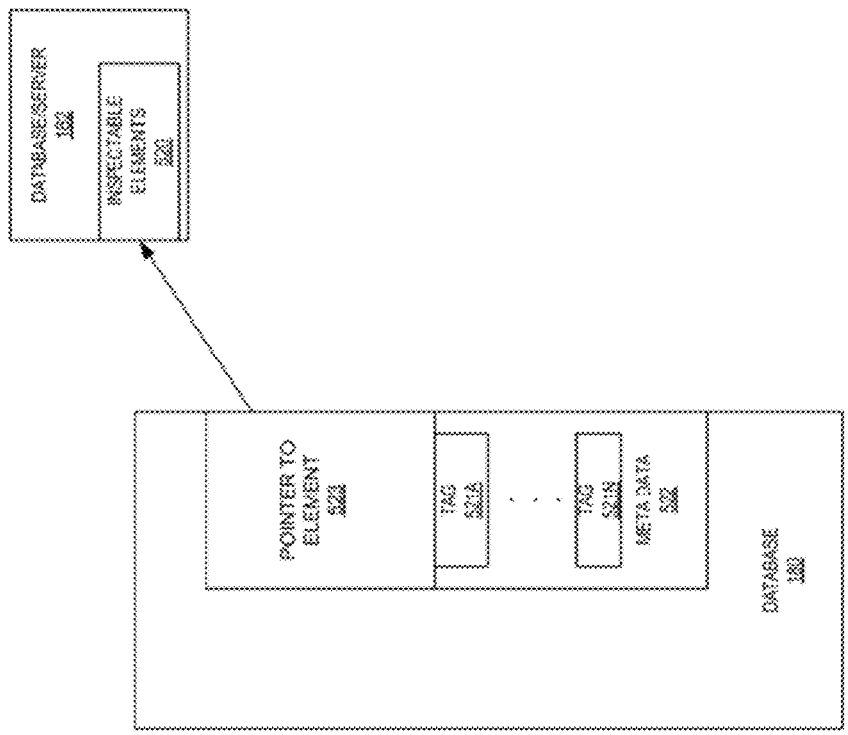
FIG. 1B is a high-level diagram illustrating another exemplary configuration of an inspectable element in accordance with at least one embodiment disclosed herein.
Figure 1A:
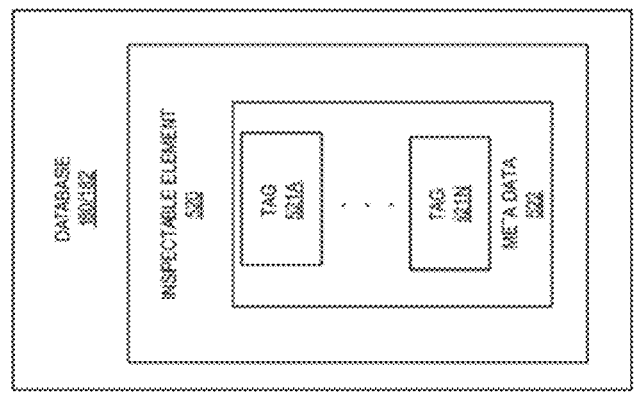
FIG. 1A is a high-level diagram illustrating an exemplary configuration of an inspectable element in accordance with at least one embodiment disclosed herein.

Turning now to FIG. 1A, a high-level diagram illustrating an exemplary configuration of an inspectable element 520 is depicted in accordance with at least one embodiment disclosed herein. As noted above, inspectable element 520 is preferably a media and/or data file, including but not limited to images/pictures, videos, music files, text files, and/or calendar entries that includes at least one data component that is displayable on the display screen associated with a computing device 115. Various metadata 522 are preferably embedded within and/or otherwise associated or linked with inspectable element 520. For example, one or more tags 521A-N (collectively tags 521) can preferably be embedded and/or associated with a particular inspectable element 520. Such tags 521 can reflect an association between a certain individual/entity and a particular inspectable element 520. For example, such tags 521 can preferably correspond to one or more individuals and/or entities that are reflected by and/or otherwise associated with the particular inspectable element 520. Thus, a single inspectable element 520 can, in certain arrangements, have multiple tags 521, such as in the case of a group photo. As will be described in greater detail below, the various tags 521 can originate from and/or be generated in any number of ways. In one arrangement, one or more users can ascribe various tags 521 to a particular inspectable element 520, while in other arrangements one or more known processing methods can be applied, such as facial recognition algorithms, which can process one or more images in order to identify one or more individuals within the image(s), as is known to those of ordinary skill in the art. Metadata including tags can be displayable, or not. It should also be noted that in certain arrangements the tags 521 can be configured to track, link to, and/or otherwise comply with one or more pre-existing identification schemes, e.g., a Facebook profile (and/or any other such user account). That is, tags 521 are preferably not simply identifiers (such as a name) that are ascribed to an inspectable element 520 by a user, but rather reflect existing accounts that have already been established. In doing so, the present dynamic depiction, coordination, and association system 100 can further build on and enhance user accounts and profiles that already exist.

At this juncture, it should be noted that metadata 522 encompasses not only tags 521, but also various other metadata items. For example, metadata 522 preferably includes information regarding the time, date, and/or location that are associated with a particular inspectable element 520. Such metadata 522 are preferably embedded with inspectable element 520 at the time the inspectable element 520 (e.g., the picture or video) is captured, as is known to those of ordinary skill in the art, thought it should be understood that such metadata can be obtained and/or edited after capture.

It should be appreciated that while FIG. 1A depicts both inspectable element 520 and metadata 522 as being stored at database 180 and/or 182 (that is, inspectable element 520 and metadata 522 are stored at the same location), in other arrangements metadata 522 and inspectable element 520 can be stored in separate locations. As depicted in FIG. 1B, in one such exemplary arrangement, metadata 522 can be stored at database 180, while inspectable element 520 (e.g., one or more images) is stored at database server 182. A pointer 523 connects and/or links metadata 522 to the inspectable element 520 to which it corresponds, as is known to those of skill in the art. Such an arrangement can be advantageous in a scenario where a large number of inspectable elements 520 have already been stored at a particular location, such as part of a social networking profile (e.g., at database/server 182). Rather than copying and/or transferring such inspectable elements 520 to database 180, using pointer 523, metadata 522 can be associated/linked (such as through an API, as is known to those of ordinary skill in the art) with its respective inspectable element(s) 520 without the need to actually store the inspectable element 520 and the metadata 522 at the same physical location. It should be understood that this arrangement is merely exemplary, and other such arrangements are also possible within the scope of the systems and methods described herein.

The operation of the dynamic depiction, association, and coordination system 100 and the various elements and components described above will be further appreciated with reference to various methods for dynamic coordination, association and/or depiction as described below, in conjunction with FIGS. 1C-4.

Figure 1C:
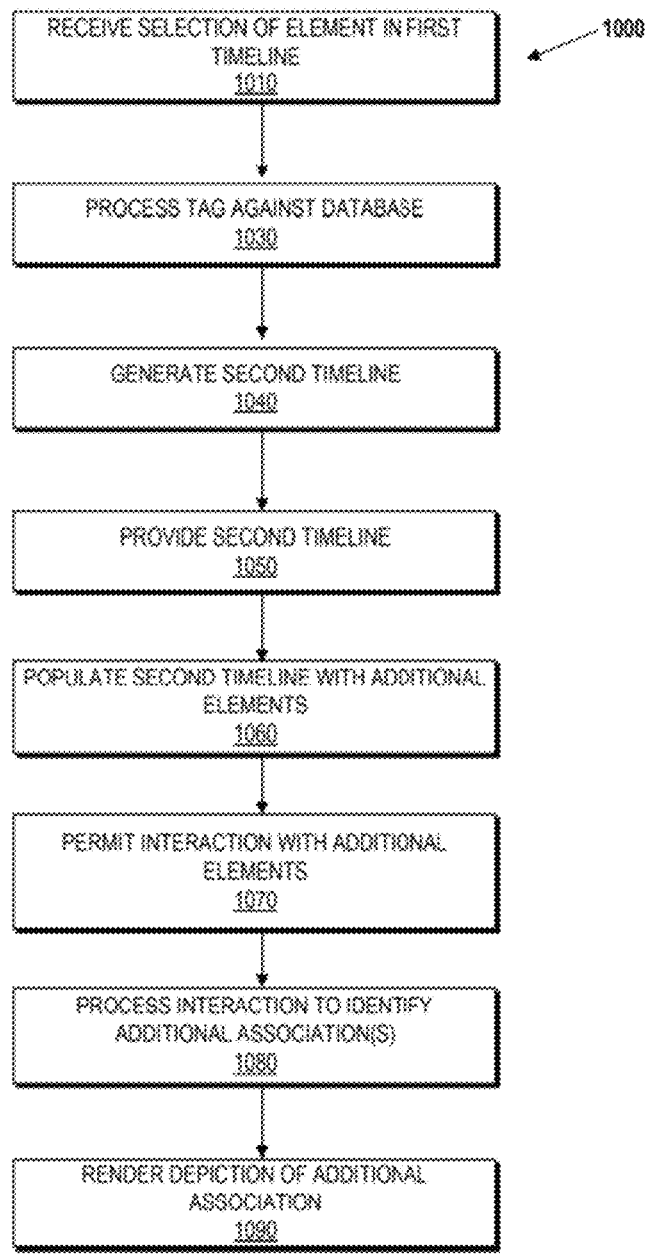
FIG. 1C is a flow diagram is described showing a routine that illustrates a broad aspect of a method for dynamic association of elements in a first timeline with a second timeline in accordance with at least one embodiment disclosed herein.

Turning now to FIG. 1C, a flow diagram is described showing a routine 1000 that illustrates a broad aspect of a method for dynamic association of elements in a first timeline with a second timeline at a central machine 105 in accordance with at least one embodiment disclosed herein. It should be appreciated that several of the logical operations described herein are implemented (1) as a sequence of computer implemented acts and/or program modules running on dynamic depiction, association, and coordination system 100 and/or (2) as interconnected machine logic circuits or circuit modules within the dynamic depiction, association, and coordination system 100 (FIG. 1). The implementation is a matter of choice dependent on the requirements of the device (e.g., size, energy, consumption, performance, etc.). Accordingly, the logical operations described herein are referred to variously as operations, structural devices, acts, or modules. Several of these operations, structural devices, acts and modules can be implemented in software, in firmware, in special purpose digital logic, and any combination thereof. It should also be appreciated that more or fewer operations can be performed than shown in the figures and described herein. These operations can also be performed in a different order than those described herein.

Figure 3:
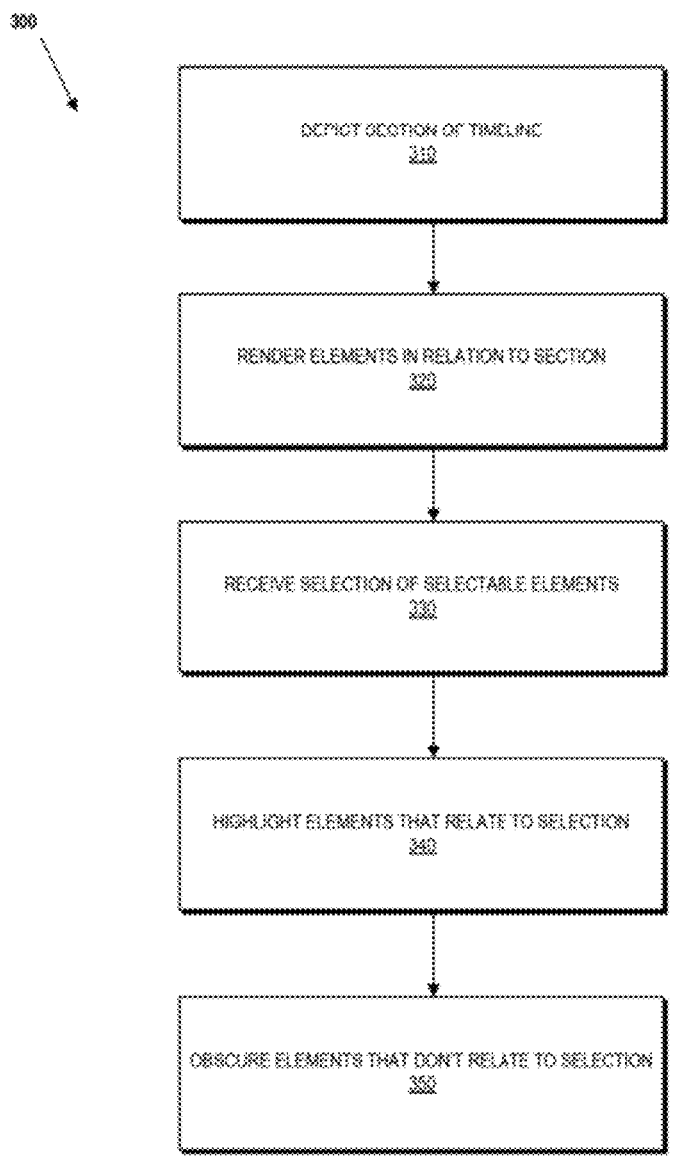
FIG. 3 is a flow diagram showing a routine that illustrates broad aspects of a method for dynamic depiction of inspectable elements across a timeline at a central machine in accordance with at least one embodiment disclosed herein.
Figure 4:
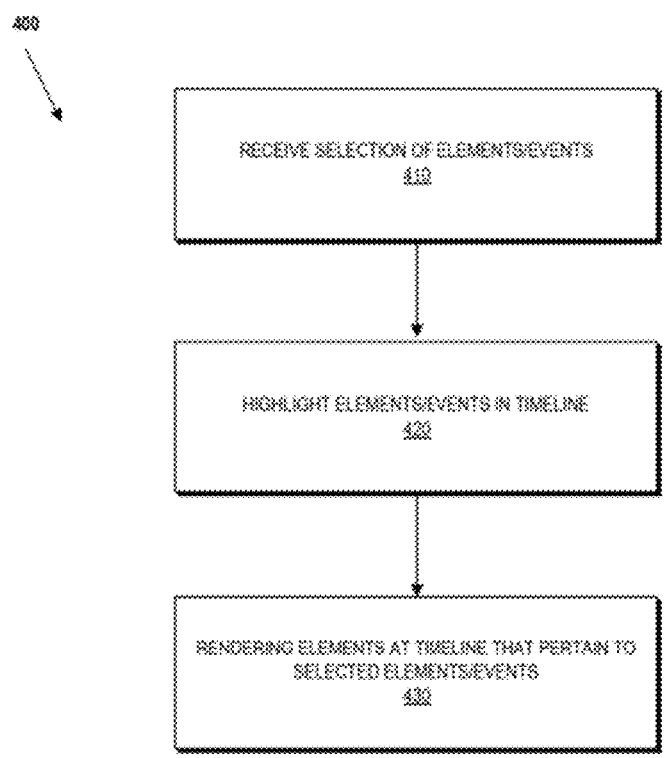
FIG. 4 is a flow diagram showing a routine that illustrates broad aspects of a method for dynamic depiction of inspectable elements shared by a first timeline and at least a second timeline at a central machine in accordance with at least one embodiment disclosed herein.
Figure 5:
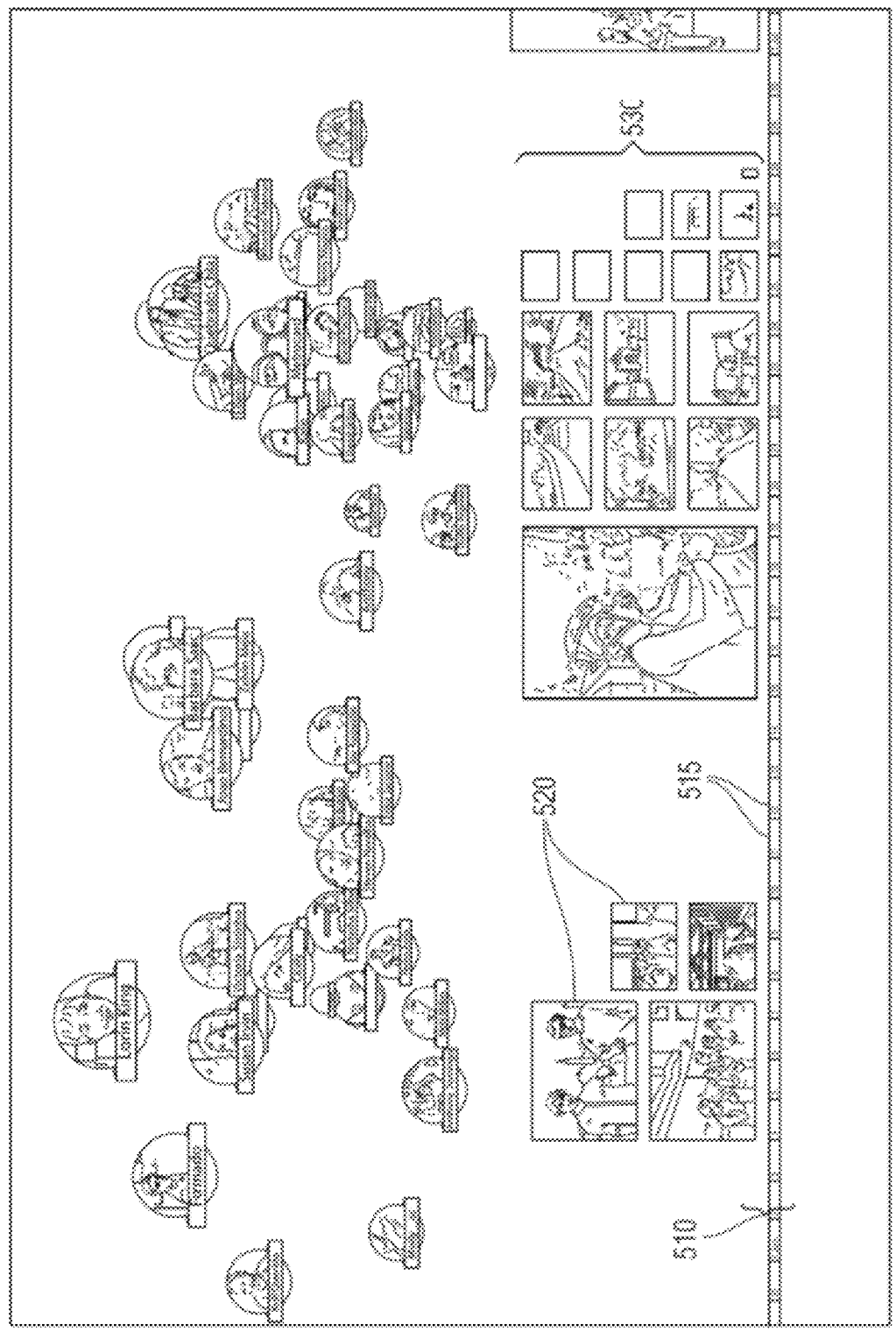
FIG. 5 depicts an exemplary screenshot of a timeline according to at least one arrangement disclosed herein.

Various of the operations depicted in FIGS. 1C-4 and described in detail herein will be appreciated with reference to FIG. 5 which depicts an exemplary timeline 510 according to at least one arrangement disclosed herein. As can be appreciated with reference to FIG. 5, timeline 510 is preferably a horizontal line representing a particular time span (e.g., a year, month, week, etc.) which can be zoomed into and/or out of by a user, thereby adjusting the viewable time span of the timeline, using methods known to those of ordinary skill in the art. It should be understood that although timeline 510 is depicted as being a horizontal timeline, it other arrangements various other timelines and/or schemes are possible, such as a vertical timeline. Based on the particular viewable time span selected by a user, the timeline 510 is preferably divided into various segments or sections 515, such as months, weeks, days, hours, etc. Furthermore, such segments or sections 515 can be further sub-divided in substantially the same manner. It should be understood that the viewable span of timeline 510 is preferably not fixed, but rather can be zoomed into and/or out of in order to select the viewing of a narrower or wider date/time range, as described herein.

Along timeline 510 are preferably one or more inspectable elements 520. As noted above, such inspectable elements 520 can correspond to practically any media and/or data file, including but not limited to images, videos, music files, text files, and/or calendar entries. One or more inspectable elements 520 can, in turn, correspond to and/or comprise one or more events 530. Events 530 can thus be understood, in part, as collections of one or more inspectable elements 520, such as a collection of inspectable elements 520 (e.g., photos and/or videos) having a common origin or theme, such as that they originate at a particular event such as a birthday party of a certain user, a particular wedding, or a particular concert. Preferably, in certain arrangements, events 530 are generated in whole and/or in part based on the metadata 522 that is stored and/or associated with the respective inspectable elements 520. For example, several inspectable elements 520, such as several images, that have several common metadata 522 items (e.g., several common users tagged in the images, at a similar location and/or date) can be identified as an event 530. Alternatively, in certain arrangements such a grouping can be proposed to a user prior to grouping the various inspectable elements 520 together as an event 530. Additionally, in certain arrangements one or more users can define an event manually by selecting the various inspectable elements 520 that correspond to the particular event. In any event, as shown in FIG. 5, such events 530 (and the inspectable elements 520 that preferably comprise them) can be depicted chronologically along timeline 510. Thus, as one moves along timeline 510 (preferably from left to right), the various inspectable elements 520, and the events 530 that they make up, are displayed.

Returning now to FIG. 1C, the process 1000 begins at step 1010 where processor 110 executing one or more of software modules 130, including, preferably, coordination application 170, receives a selection of at least one of the one or more inspectable elements 520, and/or the one or more chronological events 530 on a first timeline 510. Preferably, such a selection is received into memory 120 of central machine 105 based on and/or in response to an interaction of a user with a user interface on a computing device 115 (such as through an application or 'app' executing at computing device 115, as referenced above), as is known to those of ordinary skill in the art.

Then, at step 1030, processor 110 executing one or more of software modules 130, including, preferably, coordination application 170, processes at least one metadata 522 associated with the received selection against one or more database(s) 180, 182. That is, as noted above, the various inspectable elements 520 and/or events 530 preferably have and/or are associated with one or more metadata items 522, such as tags 521 (corresponding to one or more individuals) and/or time/date/location information. Accordingly, such metadata 522 can be processed against a database 180, 182 containing other metadata and/or inspectable elements. In doing so, one or more entities, individuals, inspectable elements and/or events can be identified that match and/or relate to one or more of the metadata items 522 associated with the selection received at step 1010. For example, in one scenario a user can select a particular inspectable element 520 such as a picture of several individuals taken at a party. The picture is preferably associated with one or more tags 521, each of which preferably correspond to a particular individual in the picture. Accordingly, each of the various tags 521 can be processed against database 180, 182 in order to identify one or more additional elements 520 that are also associated with the same tag 521 (that is, are associated with at least one of the same individuals present in the selected inspectable element 520). It should also be understood that multiple metadata items 522 can be processed simultaneously against database 180, 182 in order to identify additional elements 520 of particular relevance. By way of further example, metadata items 522 corresponding to a particular time/date and a particular location can be processed against database 180, 182. In doing so, additional elements 520 can be identified that share and/or are closely associated with the same time/date and location can be identified.

In addition, various tools and approaches can be employed in order to generate, ascribe, and/or associate one or more metadata items 522 to one or more elements 520. By way of example, one or more image processing tools and/or methods can be employed whereby an element (such as an image) can be processed to identify distinctive items (e.g., a landmark such as the Eiffel Tower) within the element, in a manner known to those of ordinary skill in the art. In doing so, metadata items 522 such as a location (e.g., Paris, France) can be generated and/or ascribed to the related item(s). Similar approaches can be employed to identify the presence of various individuals in a given item, such as by using facial recognition technologies and/or approaches, as is also known to those of ordinary skill in the art.

Then, at step 1040, processor 110 executing one or more of software modules 130, including, preferably, coordination application 170, generates one or more additional timelines 510A-N. Such timelines 510A-N preferably correspond to one or more users and/or events that are associated with the element(s) 520 and/or events 530 that were selected at step 1010. Thus, for example, where selected element 520 is an image from a party having one or more persons in the picture, and such users have been 'tagged' or designated as being in the photo (in a manner referenced above and known to those of ordinary skill in the art), that particular element 520 can be further associated with the timelines 510A-N of those tagged users. That is, upon tagging a particular user in a particular inspectable element 520, that inspectable element is preferably added to and/or associated with that tagged user's timeline. Accordingly, it can be appreciated that a user's timeline can be generated and/or grow simply by ascribing a tag 521 associated with a particular user's identity, even if that particular user has not contributed any inspectable elements to his/her own timeline.

At step 1050, processor 110 executing one or more of software modules 130, including, preferably, coordination application 170, provides one or more of the additional timelines 510A-N for display at one or more computing device(s) 115. As noted above, each of the additional timelines 510A-N are preferably associated with at least one entity and/or person identified by and/or associated with at least one metadata 522 of the particular element 520 selected from timeline 510 at step 1010, as described in detail above. This operation can be further appreciated with reference to FIG. 6, wherein upon a selection at least one of elements 520 and/or events 530 from a timeline 510 (that is, when a particular user selects one or more of elements 520 and/or events 530 using an application or viewer executing on computing device 115, which is in turn preferably in communication with central machine 105), such as that depicted in FIG. 5, one or more parallel timelines 510A-N can be generated. As noted above, such timelines 510A-N preferably correspond to one or more users and/or events that are associated with the selected element(s) 520 and/or events 530.

Figure 6:
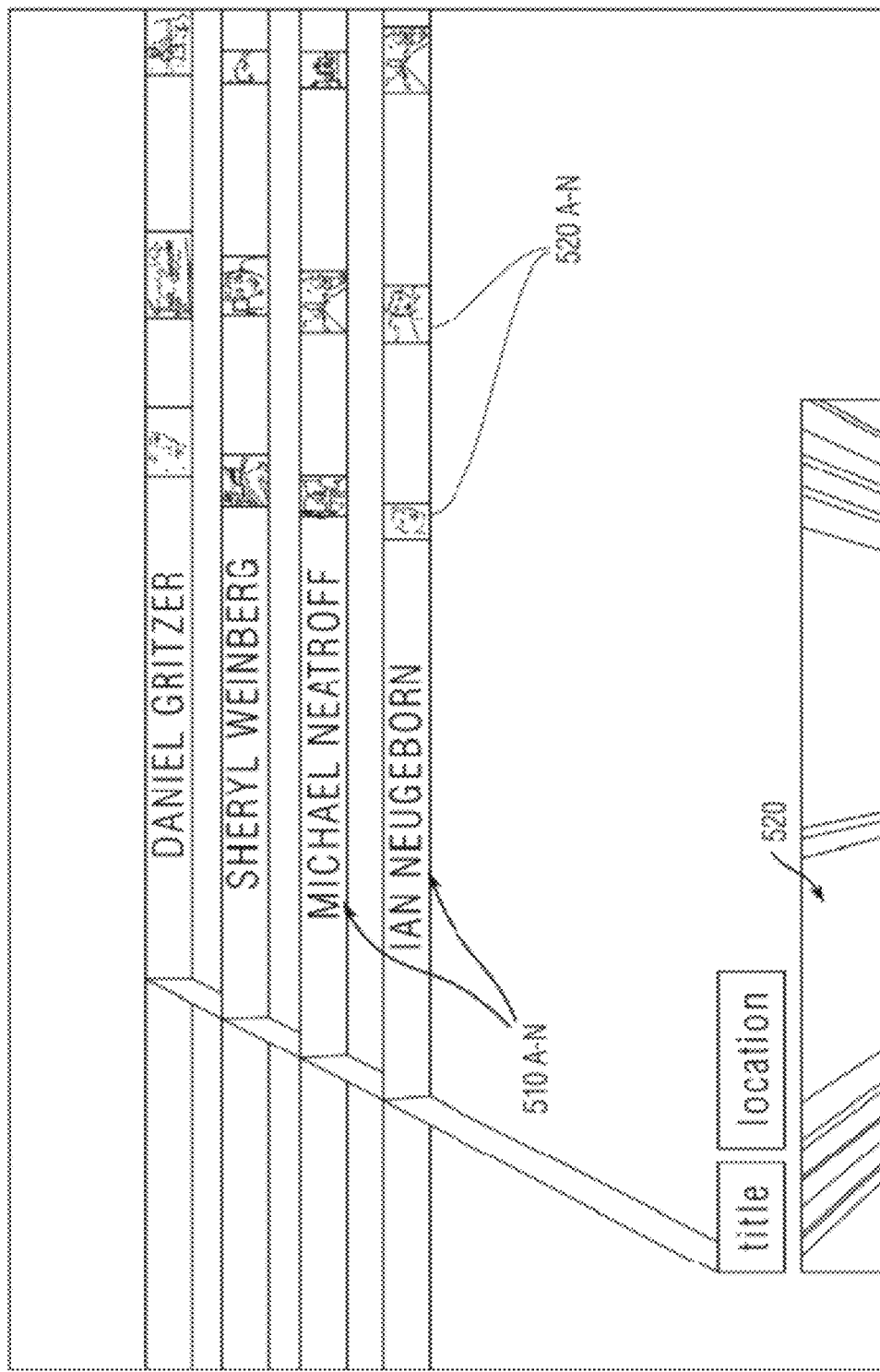
FIG. 6 depicts an exemplary screenshot of a selection of an inspectable element according to at least one arrangement disclosed herein.

At step 1060, processor 110 executing one or more of software modules 130, including, preferably, coordination application 170, populates at least one of the additional timelines 510A-N with one or more additional elements 520A-N, as depicted in FIG. 6. In doing so, such additional elements 520A-N can be retrieved from their respective database(s) 180, 182, as is known to those of ordinary skill in the art. Preferably, additional elements 520A-N are populated such that at least a portion of such elements 520A-N have a chronological proximity to the particular selected element 520 (selected at step 1010). As well, the additional timelines are displayed concurrently with the first timeline. In doing so, a dynamic association between first timeline 510 and one or more additional timelines 510A-N can be provided, in which the association is made through one or more inspectable elements. By way of illustration, upon selecting a particular element 520 at step 1010, such as a picture in the timeline 510 of a particular user, a depiction of parallel timelines 510A-N of the users tagged in that particular inspectable element 520 can be generated (at step 1040) and provided (at step 1050), as depicted in FIG. 6 and described in detail above. Such timelines 510A-N are preferably depicted as being parallel to timeline 510, and further preferably encompass the same general time span as has been selected for timeline 510, as referenced above. Moreover, such timelines 510A-N further depict various additional inspectable elements 520A-N which are preferably associated, such as in time proximity, to the selected element 520 (as can be determined by various metadata items such as time/date). Accordingly, it can be appreciated that by selecting a single element 520, a user can further view those inspectable elements 520A-N present on the timelines 510A-N of other users, such users being associated with the selected element 520. It can be further appreciated that the various elements 520A-N that populate such additional timelines 510A-N are preferably chronologically proximal to the element selected at step 1010 (based on various metadata 522 pertaining to time/date). As such, even if such additional elements 520A-N are not actually part of the same event 530 as the selected element 520, such additional elements 520A-N are discoverable by a user in at least the manner described in detail above. This functionality is particularly advantageous when considered in context of an event 530. Being that a particular user can attend an event such as a party, he/she is likely interested in the various inspectable elements 520A-N that are present in the timelines 510A-N of other users who also attended the same event. Given the chronological arrangement of the timelines 510, it can be appreciated that it is likely that the various inspectable elements 520A-N that are in close chronological proximity to the selected inspectable element 520 will also be of interest to the selecting user, even if such inspectable elements 520A-N are not formally associated with the same event 530 (due to any number of factors, including human error or oversight).

At step 1070, processor 110 executing one or more of software modules 130, including, preferably, coordination application 170, permits interaction with one or more of the additional elements 520A-N, such as through an interaction of a user with a user interface on a computing device 115 (such as through an application or 'app' executing at computing device 115, as referenced above), as is known to those of ordinary skill in the art. In doing so, one or more of the various steps of routine 1000 can be repeated for such elements 520A-N, substantially in the manner described in detail above, thereby enabling a user to discover additional inspectable elements.

Moreover, at step 1080, processor 110 executing one or more of software modules 130, including, preferably, coordination application 170, can process the interaction (from step 1070) in order to identify at least one additional association between at least a second timeline 510A and the first timeline 510, substantially in the manner described below with respect to steps 230 and 240.

Then, at step 1090, processor 110 executing one or more of software modules 130, including, preferably, coordination application 170, renders a depiction of the additional association(s) in relation to at least the first timeline 510, substantially in the manner described below with respect to steps 250. In doing so, at least one additional element of the second timeline 510A can be dynamically associated with the first timeline 510 in a chronologically coordinated manner, as described in detail below.

Figure 2:
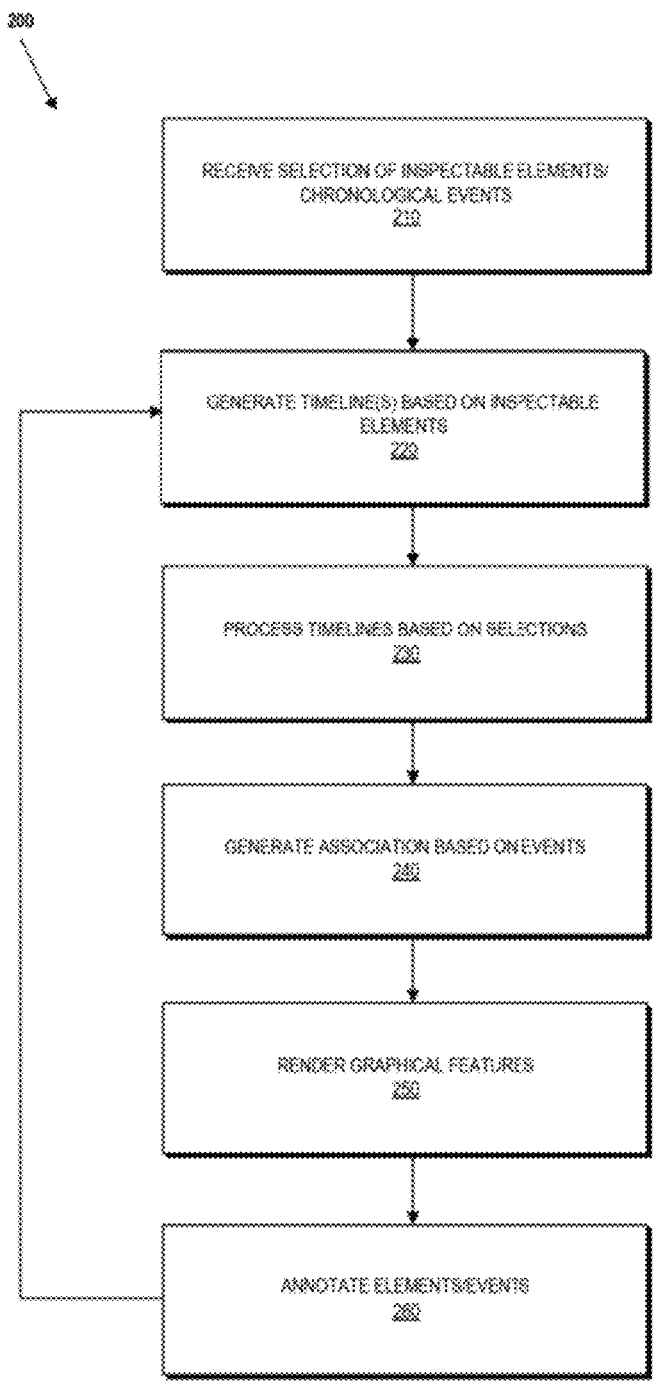
FIG. 2 is a flow diagram showing a routine that illustrates broad aspects of a method for dynamic chronological coordination of a first timeline and a second timeline with a central machine in accordance with at least one embodiment disclosed herein.

Turning now to FIG. 2, a flow diagram is described showing a routine 200 that illustrates a broad aspect of a method for dynamic chronological coordination of a first timeline and a second timeline with a central machine 105 in accordance with at least one embodiment disclosed herein.

The process begins at step 210 where processor 110 executing one or more of software modules 130, including, preferably, coordination application 170, receives a selection of at least one of the one or more inspectable elements 520A-N, and/or the one or more chronological events 530A-N of at least a second timeline 510A. That is, upon receiving such a selection at central machine 105 (such as from an application or 'app' executing at computing device 115, as referenced above), wherein a user selects such an element 520A-N and/or event 530A-N, a further interface can be generated, as referenced above and shown in FIG. 7, wherein at least two timelines, such as timelines 510 and 510A are rendered/generated in parallel.

Figure 7:
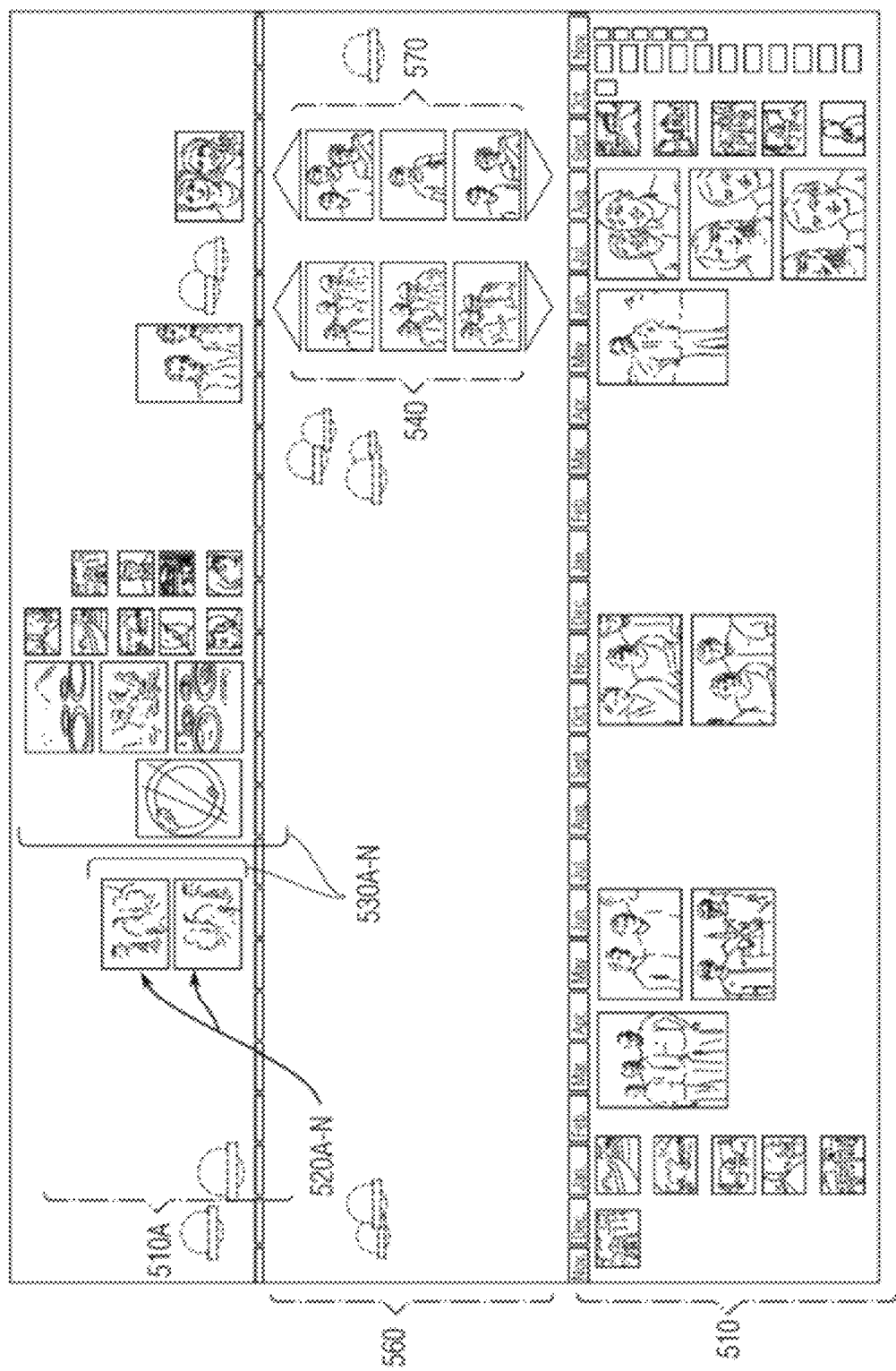
FIG. 7 depicts an exemplary screenshot of two parallel timelines according to at least one arrangement disclosed herein.

Upon receiving the selection of one or more inspectable elements 520 and/or events 530 from a timeline, such as timeline 510A, at step 220, processor 110 executing one or more of software modules 130, including, preferably, coordination application 170, generates at least one of a first timeline 510 and a second timeline 510A based on one or more inspectable elements 520 and/or the events 530, substantially as described in detail above and depicted in one exemplary arrangement in FIG. 7.

Then, at step 230, processor 110 executing one or more of software modules 130, including, preferably, coordination application 170, processes the first timeline 510 against at least a second timeline 510A. Alternatively, it can be appreciated that in certain arrangements second timeline 510A is processed against first timeline 510. In any event, such processing is preferably initiated by and/or based on the selection referenced above, and such processing further serves to identify one or more common chronological events 540 shared across the first timeline 510 and the second timeline 510A. Such common chronological events 540 are preferably events that are common to both timelines 510, 510A, for example, a party or concert that each of the respective users of the timelines 510, 510A attended.

Upon identifying one or more common chronological events 540, at step 240, processor 110 executing one or more of software modules 130, including, preferably, coordination application 170, generates an association of the common chronological events 540 within the context of the first timeline 510 and the second timeline 510A, as shown in FIG. 7. For example, such an association can be depicted in a shared space 560, such as in a space situated between the timelines 510, 510A (such as that shown in FIG. 7) which depicts such common chronological events 540 along the respective timelines 510, 510A.

Then, at step 250, processor 110 executing one or more of software modules 130, including, preferably, coordination application 170, renders one or more graphical features that reflect the association. By way of example, one or more further common chronological events 570 (that is, events that are shared by both timelines 510 and 510A) can be plotted between the timelines 510, 510A, thus further connecting the users of the respective timelines based on events to which the users are mutually connected to and/or associated with. That is, although common chronological event 540 was initially identified based on a user selection (as described above), further associations can be further identified based on this initial association. For example, having identified that the user of timeline 510 and the user of timeline 510A shared a common event 540 in the month of June, further common events 570, such as a wedding both users attended in September, can be further identified and/or rendered, as described herein.

Moreover, in certain arrangements various sections and/or segments 515 of the timelines 510, 510A can be highlighted (such as by increasing their size and/or changing their color) according to a concentration of common chronological events 540, 570. In doing so, various graphical trends can be easily perceived, such as the frequency of such events and/or the proximity of such events to one another (for example, friends who are college students can have frequent common chronological events during the academic year, but may not have as many during the summer break or other such vacation).

At step 260, processor 110 executing one or more of software modules 130, including, preferably, coordination application 170, annotates at least one of (a) the one or more inspectable elements 520, and/or (b) the one or more chronological events 530. In doing so, a particular element 520 (such as a photo) can be 'tagged' with the identities of one or more users that appear in and/or are associated with the photo, as described in detail above and known to those of ordinary skill in the art. In doing so, the photo is preferably further associated with the timelines of such users, such as in the manner described in detail above. Moreover, it can be appreciated that based on such ascribing, a timeline 510 can be generated, as also referenced above (such as in the case where a user is tagged in an element for the first time). Accordingly, it can be appreciated that in certain arrangements routine 200 can further proceed from step 260 back to step 220, where one or more timelines are initially generated, as described in detail above and shown in FIG. 2.

Turning now to FIG. 3, a flow diagram is described showing a routine 300 that illustrates an aspect of a method for dynamic depiction of inspectable elements 520 across a timeline 510 at a central machine 105 in accordance with at least one embodiment disclosed herein.

At step 310, processor 110 executing one or more of software modules 130, including, preferably, coordination application 170, depicts at least a section 115 of the timeline 510, substantially in the manner described in detail above.

Figure 8:
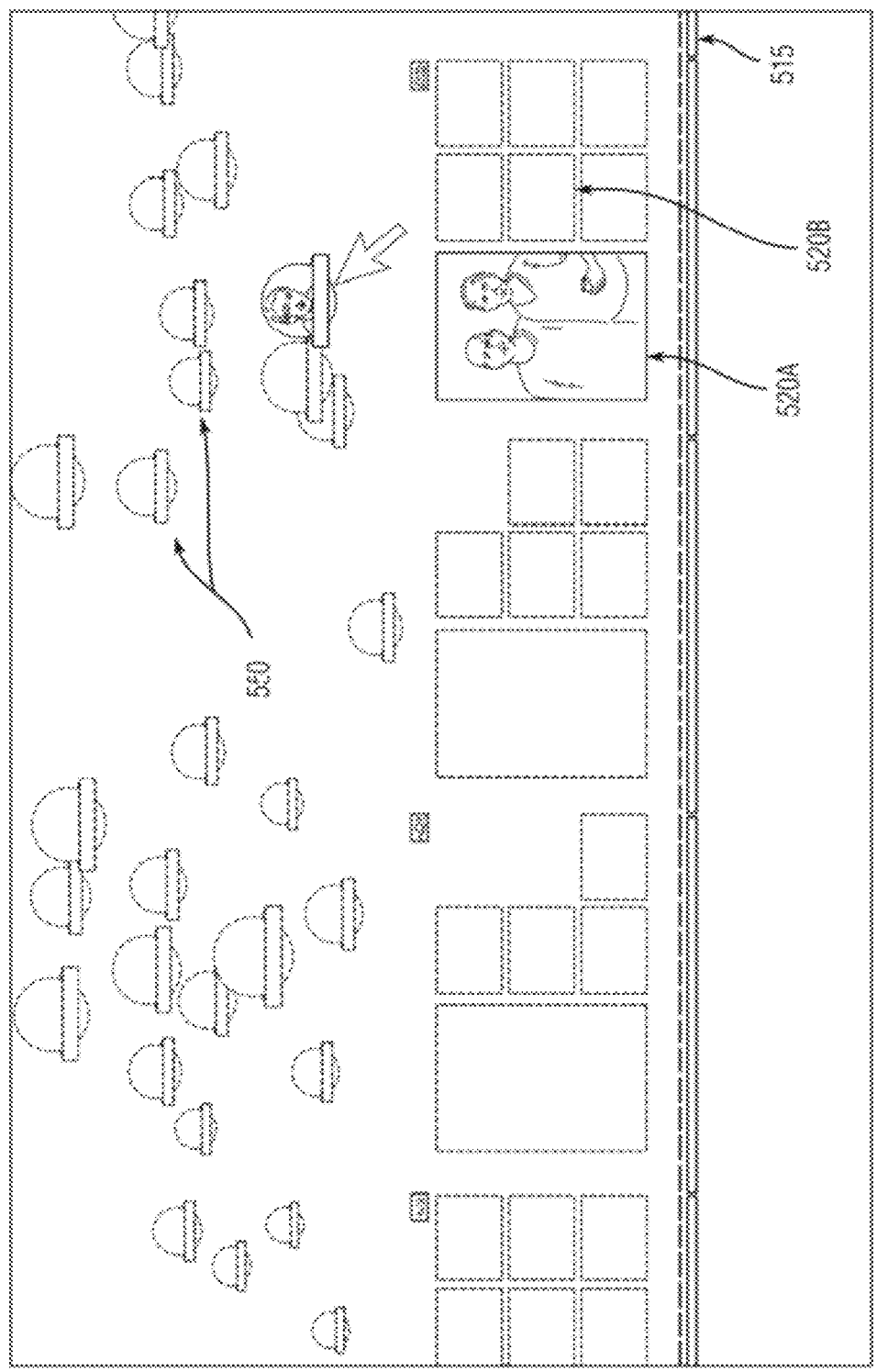
FIG. 8 depicts an exemplary screenshot of a selection of a selectable element according to at least one arrangement disclosed herein.

At step 320, processor 110 executing one or more of software modules 130, including, preferably, coordination application 170, renders one or more selectable elements 550 (of FIG. 8) in relation to the section 515. It should be understood that the selectable elements 550 preferably correspond to one or more users and/or one or more events that are related to the section 515. For example, as depicted in FIG. 8, various users that appear throughout a timeline 510 (such as in inspectable elements 520 via tags ascribed to such elements, as referenced above) are depicted as balls or bubbles of varying sizes that are positioned above the section 515 of the timeline 510 that they are present within. For example, if a particular user is tagged frequently across various inspectable elements 520 found within a particular section 515, the selectable element 550 of that user will preferably be rendered larger and/or more prominently than that of a user who appears relatively fewer times within the same section 515.

At step 330, processor 110 executing one or more of software modules 130, including, preferably, coordination application 170, receives a selection of at least one of the selectable elements 550. That is, a user can select a particular one of the selectable elements 550, such as that corresponding to a particular user, as described above.

In response to the selection, at step 340, processor 110 executing one or more of software modules 130, including, preferably, coordination application 170, highlights one or more of the inspectable elements 520, such as element 520A, preferably within the section 515, that relate to the selection 550. For example, if a particular user is selected, inspectable elements 520 (such as photos) that pertain to that selected user are highlighted, such as element 520A as shown in FIG. 8.

Conversely, at step 350, processor 110 executing one or more of software modules 130, including, preferably, coordination application 170, obscures one or more of the inspectable elements 520, such as element 520B within the section 515 that do not relate to the selection (that is, that are not tagged and/or associated with the particular selected user).

Figure 9:
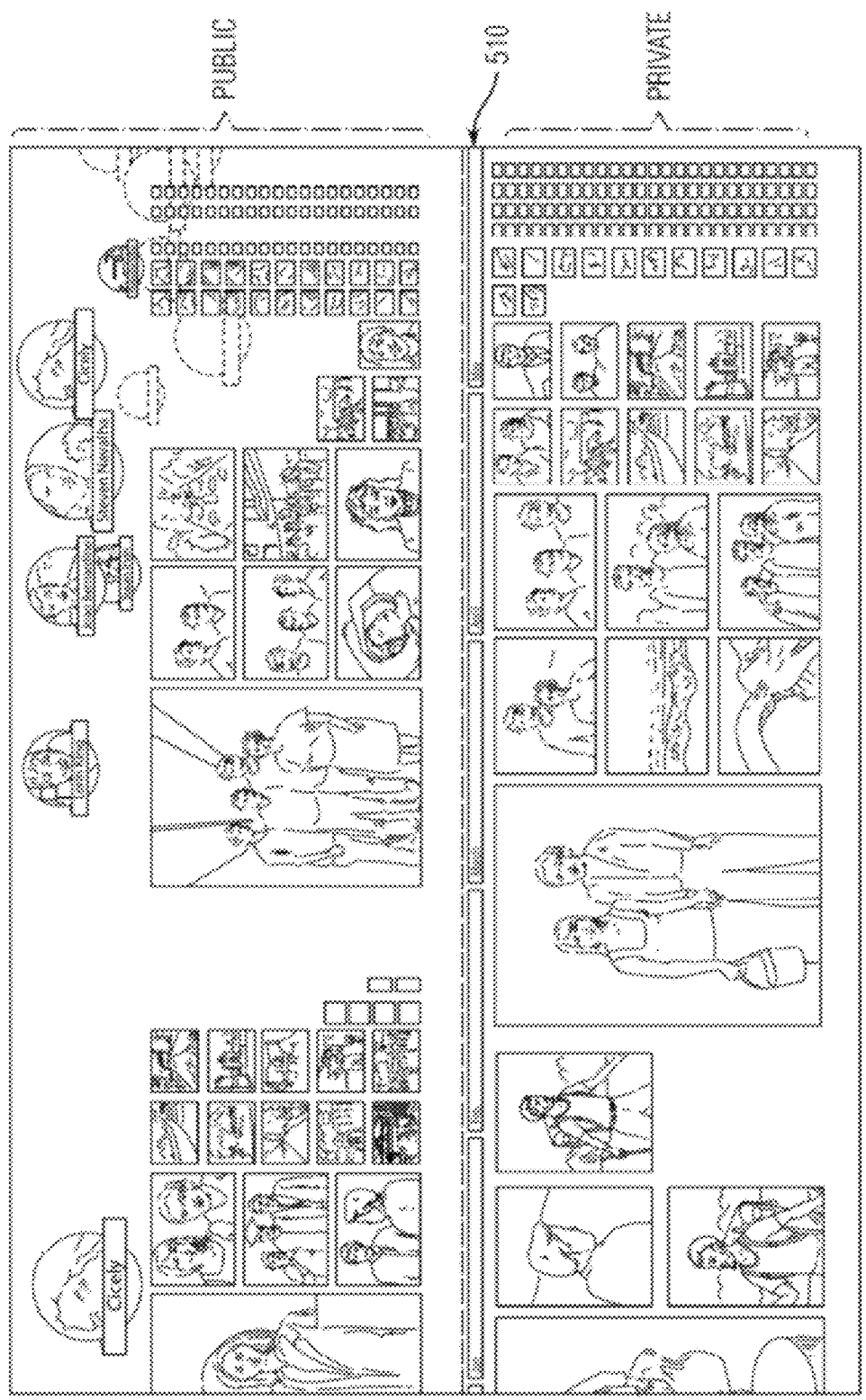
FIG. 9 depicts an exemplary screenshot of public and private viewing modes across a single timeline according to at least one arrangement disclosed herein.

It should be further understood that in certain arrangements, timeline 510 can have one or more viewing modes. That is, timeline 110 can be configured such that certain of the inspectable elements 520 can be viewable in a first mode by certain users, but are not viewable in a second mode. By way of example, a user can configure timeline 510 to have public and private modes, such that certain of the inspectable elements are designated as private, and thus can only be seen by the user him/herself on the timeline, while other inspectable elements 520 can be designated as public, and thus can be viewable by other users as well, substantially in the manner described in detail herein. Accordingly, it can be appreciated that an interface can be depicted wherein such public and private elements can be depicted on a single timeline 510, and can further be dragged from one section to another, in a manner known to those of ordinary skill in the art. FIG. 9 depicts such public and private elements across a timeline.

Turning now to FIG. 4, a flow diagram is described showing a routine 400 that illustrates an aspect of a method for dynamic depiction of inspectable elements shared by a first timeline and at least a second timeline at a central machine 105 in accordance with at least one embodiment disclosed herein.

At step 410, processor 110 executing one or more of software modules 130, including, preferably, coordination application 170, receives at a first timeline 510 a selection of at least one of the one or more inspectable elements 520, and/or the one or more chronological events 530, substantially in the manner described in detail above.

In response to the selection, at step 420, processor 110 executing one or more of software modules 130, including, preferably, coordination application 170 highlights at least one of the one or more inspectable elements 520, and/or the one or more chronological events 530 at the at least second timeline 510A, such as that depicted in FIG. 7.

Then, at step 430, processor 110 executing one or more of software modules 130, including, preferably, coordination application 170, renders one or more inspectable elements 520 at the at least second timeline 510A such that the selected inspectable element 520 pertains to at least one of the one or more selected inspectable elements, and the one or more selected chronological events.

By way of example, it can be appreciated that, as described in detail above, various timelines 510, 510A can share one or more inspectable elements 520 (e.g., photographs, videos, etc.) and/or events 530. Accordingly, upon selection of an inspectable element 520 and/or an event 530 at a first timeline 510, a corresponding element 520/event 530 can be highlighted at a second timeline 510A. That is, the same element/event as selected in the first timeline 510—which is shared by and thus also present in the second timeline 510A—can be highlighted within the context of the second timeline 510A in response to the selection of that element/event in the first timeline 510. Furthermore, various additional elements/events that are associated with the selected shared element/event can be rendered. In doing so, by selecting an element/event from a first timeline 510, a user can view not only the same element/event within the context of a second timeline 510A, but can also view additional elements/events in second timeline 510A that pertain to the selected element/event. Being that these further elements/events pertain to the selected element/event, it is likely that the selecting user has interest in them as well. However, being that such elements/events are present in second timeline 510A, it is unlikely that the selecting user would learn of such further elements/events without the functionality described herein.

At this juncture, it should be noted that although much of the foregoing description has been directed to systems and methods for dynamic depiction and coordination, the systems and methods disclosed herein can be similarly deployed and/or implemented in scenarios, situations, and settings far beyond the referenced scenarios. It can be readily appreciated that dynamic depiction, association, and coordination system 100 can be effectively employed in practically any scenario where such dynamic depiction and coordination is of value. It should be further understood that any such implementation and/or deployment is within the scope of the systems and methods described herein.

It is to be understood that like numerals in the drawings represent like elements through the several figures, and that not all components and/or steps described and illustrated with reference to the figures are required for all embodiments or arrangements. It should also be understood that the embodiments and/or arrangements of the systems and methods disclosed herein can be incorporated as a software algorithm, application, program, module, or code residing in hardware, firmware and/or on a computer useable medium (including software modules and browser plug-ins) that can be executed in a processor of a computer system or a computing device to configure the processor and/or other elements to perform the functions and/or operations described below. It should be appreciated that according to at least one embodiment, one or more computer programs or applications that when executed perform methods of the present invention need not reside on a single computer or processor, but can be distributed in a modular fashion amongst a number of different computers or processors to implement various aspects of the systems and methods disclosed herein.

Thus, illustrative embodiments and arrangements of the present systems and methods provide a computer implemented method, computer system, and computer program product for dynamic depiction and coordination. The flowchart and block diagrams in the figures illustrate the architecture, functionality, and operation of possible implementations of systems, methods and computer program products according to various embodiments and arrangements. In this regard, each block in the flowchart or block diagrams can represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof.

It should be noted that use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

The subject matter described above is provided by way of illustration only and should not be construed as limiting. Various modifications and changes can be made to the subject matter described herein without following the example embodiments and applications illustrated and described, and without departing from the true spirit and scope of the present invention, which is set forth in the following claims.

What is claimed is:

1. A computer implemented method for dynamic association of elements in a first timeline with a second timeline at a central machine, the central machine having a processor, a memory, and a coordination application stored in the memory and executable by the processor, and each of the first timeline and the second timeline having one or more inspectable elements that correspond to one or more chronological events, the method comprising:

receiving a selection of a particular element in the first timeline into the memory of the central machine through interaction with a user interface on a computing device;

processing at least one metadata associated with the received selection against a database;

providing to the computing device for display thereat, parallel to the first timeline at least a second timeline based on the result of the processing, the second timeline being associated with an entity or person identified in the at least one metadata of the particular element of the first timeline;

populating the second timeline with one or more additional elements from the database, at least a portion of which has a chronological proximity to the particular element in the first timeline to thereby provide a dynamic association between the first and second timelines; and graphically depicting the dynamic association in a space between the first timeline and the second timeline and in relation to the first timeline and the second timeline;

whereby at least one of the one or more additional elements of the second timeline is dynamically associated with the first timeline in a chronologically coordinated manner.

2. The method of claim 1, including the additional steps of:
permitting interaction with the one or more additional elements on the second timeline;
processing the interaction so as to identify at least one additional association between the second timeline and the first timeline,
rendering a depiction of the additional association in the space between the first timeline and the second timeline and in relation to the first timeline and the second timeline.

3. The method of claim 1, wherein the chronological proximity includes the additional elements that are closest in time to the particular element on the first timeline.

4. The method of claim 1, wherein the chronological proximity includes a range of time that spans the time of the particular element on the first timeline.

5. The method of claim 1, wherein the processing step comprises generating at least a second timeline based on the received selection, the second timeline being associated with an entity or person identified in at least one metadata of the particular element of the first timeline.

6. The method of claim 1, wherein the at least one metadata comprises at least one tag.

7. A computer implemented method for dynamic chronological coordination of a first timeline and a second timeline at a central machine, the central machine having a processor, a memory, and a coordination application stored in the memory and executable by the processor, the first timeline and the second timeline being oriented parallel to one another, and each of the first timeline and the second timeline having one or more inspectable elements that correspond to one or more chronological events, the method comprising:
receiving a selection from the first timeline of at least one of
(a) the one or more inspectable elements, and
(b) the one or more chronological events;
processing the selection from first timeline against at least the second timeline to identify one or more common chronological events shared across the first timeline and the second timeline;
generating an association of the common chronological events within the context of the first timeline and the second timeline; and
rendering one or more graphical features reflecting the association in a chronologically coordinated manner in a space between the first timeline and the second timeline, and in relation to the first timeline and the second timeline.

8. The method of claim 7, further comprising annotating at least one of
(a) the one or more inspectable elements, and
(b) the one or more chronological events.

9. The method of claim 8, wherein the second timeline is at least one of (a) generated by the annotating step, and (b) augmented based on the annotating step.

10. The method of claim 7, wherein the inspectable elements include at least one of: an image, a video, a music file, a text file, and a calendar entry.

11. The method of claim 7, wherein the graphical depiction comprises plotting connections between the common chronological events shared by the first timeline and the second timeline.

12. The method of claim 7, wherein the graphical depiction comprises highlighting sections of the first timeline and the second timeline according to a concentration of the common chronological events.

13. A computer implemented method for dynamic depiction of inspectable elements across a first timeline associated with a first user at a central machine, the central machine having a processor, a memory, and a coordination application stored in the memory and executable by the processor, and the first timeline having one or more inspectable elements the method comprising:
depicting at least a section of the first timeline;
rendering one or more selectable elements in relation to the section of the first timeline, the selectable elements representing at least one of (a) one or more users and (b) one or more events that are related to the section of the first timeline;
receiving a selection of at least one of the selectable elements; and
in response to the selection,
a) highlighting one or more of the inspectable elements within the section of the first timeline that relate to the selection,
b) rendering a portion of a second timeline of a second user parallel to the section of the first timeline, and
c) graphically depicting in a chronologically coordinated manner and in a space between the section of the first timeline and the portion of the second timeline an association of the highlighted elements in relation to the section of the first timeline and the portion of the second timeline.

14. The method of claim 13, further comprising obscuring one or more of the inspectable elements within the section that do not relate to the selection.

15. The method of claim 13, wherein the one or more inspectable elements correspond to one or more chronological events on the first timeline.

16. The method of claim 13, wherein the first timeline has at least a first viewing mode and a second viewing mode.

17. The method of claim 16, wherein certain of the inspectable elements are viewable in the first viewing mode but are not viewable in the second viewing mode.

18. The method of claim 16, wherein the first viewing mode is a private viewing mode and the second viewing mode is a public viewing mode.

19. The method of claim 13, wherein the one or more inspectable elements are grouped.

20. The method of claim 13, wherein the inspectable elements include at least one of: an image, a video, a music file, a text file, and a calendar entry.

* * * * *